US012805444B2

(12) United States Patent
Franke et al.

(10) Patent No.: US 12,805,444 B2
(45) Date of Patent: Nov. 24, 2026

(54) ACTIVE RETURN TUBE AND METHOD OF CONTROLLING SAME

(71) Applicant: Deere & Company, Moline, IL (US)

(72) Inventors: Derek J. Franke, Monroeville, IN (US); Michael Tupper, Bettendorf, IA (US); Nicholas B. Vanderleest, Lyndon, IL (US); Zachary A. Meyers, Milan, IL (US)

(73) Assignee: DEERE & COMPANY, Moline, IL (US)

( * ) Notice: Subject to any disclaimer, the term of this patent is extended or adjusted under 35 U.S.C. 154(b) by 326 days.

(21) Appl. No.: 18/407,085

(22) Filed: Jan. 8, 2024

(65) Prior Publication Data

US 2025/0221343 A1 Jul. 10, 2025

(51) Int. Cl.

| | |
|---|---|
| ***A01D 75/02*** | (2006.01) |
| ***A01D 45/00*** | (2018.01) |
| ***A01D 57/20*** | (2006.01) |
| ***A01F 12/52*** | (2006.01) |

(52) U.S. Cl.

CPC ............. *A01D 75/02* (2013.01); *A01D 45/00* (2013.01); *A01D 57/20* (2013.01); *A01F 12/52* (2013.01)

(58) Field of Classification Search

CPC ........ A01D 75/02; A01D 45/00; A01D 57/20; A01D 41/1217; A01F 12/52

See application file for complete search history.

(56) References Cited

U.S. PATENT DOCUMENTS

| | | | | |
|---|---|---|---|---|
| 4,481,756 | A * | 11/1984 | Schartz | A01D 41/1273 56/DIG. 15 |
| 5,421,777 | A * | 6/1995 | Strubbe | A01F 12/52 460/13 |
| 10,687,470 | B2 * | 6/2020 | Kristensen | A01F 12/305 |
| 2006/0025188 | A1 * | 2/2006 | Schmidt | A01F 12/52 460/114 |
| 2016/0316632 | A1 * | 11/2016 | Vandevelde | A01F 12/444 |
| 2023/0240191 | A1 * | 8/2023 | Mayerle | A01F 12/446 56/14.7 |

FOREIGN PATENT DOCUMENTS

| | | | | |
|---|---|---|---|---|
| CA | 1124607 A | * 6/1982 | | A01F 12/52 |
| CN | 102291980 B | * 8/2013 | | A01D 41/00 |
| CN | 111820015 A | * 10/2020 | | A01F 12/52 |
| EP | 2055178 A2 | * 5/2009 | | A01F 12/52 |
| EP | 2064940 A1 | * 6/2009 | | A01F 12/52 |
| EP | 2064941 A1 | * 6/2009 | | A01F 12/22 |
| EP | 4552470 A1 | * 5/2025 | | A01F 12/56 |

* cited by examiner

*Primary Examiner* — Arpad Fabian-Kovacs

(74) *Attorney, Agent, or Firm* — HARNESS, DICKEY & PIERCE, P.L.C.

(57) ABSTRACT

An active return tube includes a hollow body defining a longitudinal axis, the hollow body including a first opening formed in the hollow body, the first opening defining a first side and a second side opposite the first side, the second side extending along the hollow body at an angle oblique to the longitudinal axis.

20 Claims, 7 Drawing Sheets

ACTIVE RETURN TUBE AND METHOD OF CONTROLLING SAME

The present disclosure relates to agricultural machines, forestry machines, construction machines and turf management machines.

BACKGROUND

There are a wide variety of different types of agricultural machines. Some agricultural machines include harvesters, such as combine harvesters, sugar cane harvesters, cotton harvesters, self-propelled forage harvesters, and windrowers. Some harvesters can also be fitted with different types of heads to harvest different types of crops.

SUMMARY

Some example embodiments include a harvester including a plurality of selectable machine settings.

At least one example embodiment provides an active return tube including a hollow body defining a longitudinal axis, the hollow body including a first opening formed in the hollow body, the first opening defining a first side and a second side opposite the first side, the second side extending along the hollow body at an angle oblique to the longitudinal axis.

At least one example embodiment provides a harvester including an active return tube including a hollow body defining a longitudinal axis, the hollow body including a first opening formed in the hollow body, the first opening defining a first side and a second side opposite to the first side, the second side extending along the hollow body at an angle oblique to the longitudinal axis.

At least one example embodiment provides a method for controlling a rotation of an active return tube, the method including controlling an amount of grain that is discharged from a first opening of the active return tube by controlling a rotation of the active return tube.

At least one example embodiment provides a non-transitory computer readable storage medium storing computer executable instructions that, when executed, cause a device to perform a method for controlling a rotation of an active return tube, the method including controlling an amount of grain that is discharged from a first opening of the active return tube by controlling a rotation of the active return tube.

At least one example embodiment provides a harvester including a means for controlling an amount of grain that is discharged from a first opening of the active return tube by controlling a rotation of the active return tube.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In some example embodiments a harvester may be capable of automatically performing various functions (e.g., adjust settings of the harvester to perform a given function). For example, a harvester may be capable of automatically performing harvesting functions, terrain functions, cleaning functions, etc.

In some example embodiments, a harvester may include a cleaning subsystem for separating grain from material other than grain (MOG).

At least one example embodiment provides an active return tube including a hollow body defining a longitudinal axis, the hollow body including a first opening formed in the hollow body, the first opening defining a first side and a second side opposite the first side, the second side extending along the hollow body at an angle oblique to the longitudinal axis.

The first opening may include a plurality of first openings.

The plurality of first openings may be spaced apart along the longitudinal axis.

The hollow body may further include a second opening on an opposite side of the hollow body from the first opening in a transverse direction.

The active return tube may further include a gear configured to rotate the active return tube.

The hollow body may be cylindrical.

The hollow body may include an inner surface formed of a polymeric material.

The second side may extend along the hollow body at the angle such that a size of the first opening increases in a direction of flow of material through the hollow body.

At least one example embodiment provides a method for controlling a rotation of an active return tube, the method including controlling an amount of grain that is discharged from a first opening of the active return tube by controlling a rotation of the active return tube.

The method may further include determining an amount of rotation of the active return tube based on an amount of grain discharged from the active return tube.

The determining the amount of rotation may include determining a direction of rotation of the active return tube.

The controlling the amount of grain that is discharged from the first opening may include rotating the active return tube about a return tube such that the first opening gradually aligns with a plurality of second openings of the return tube in a direction of flow of material through a hollow body of the active return tube as the active return tube rotates.

Figure 1:
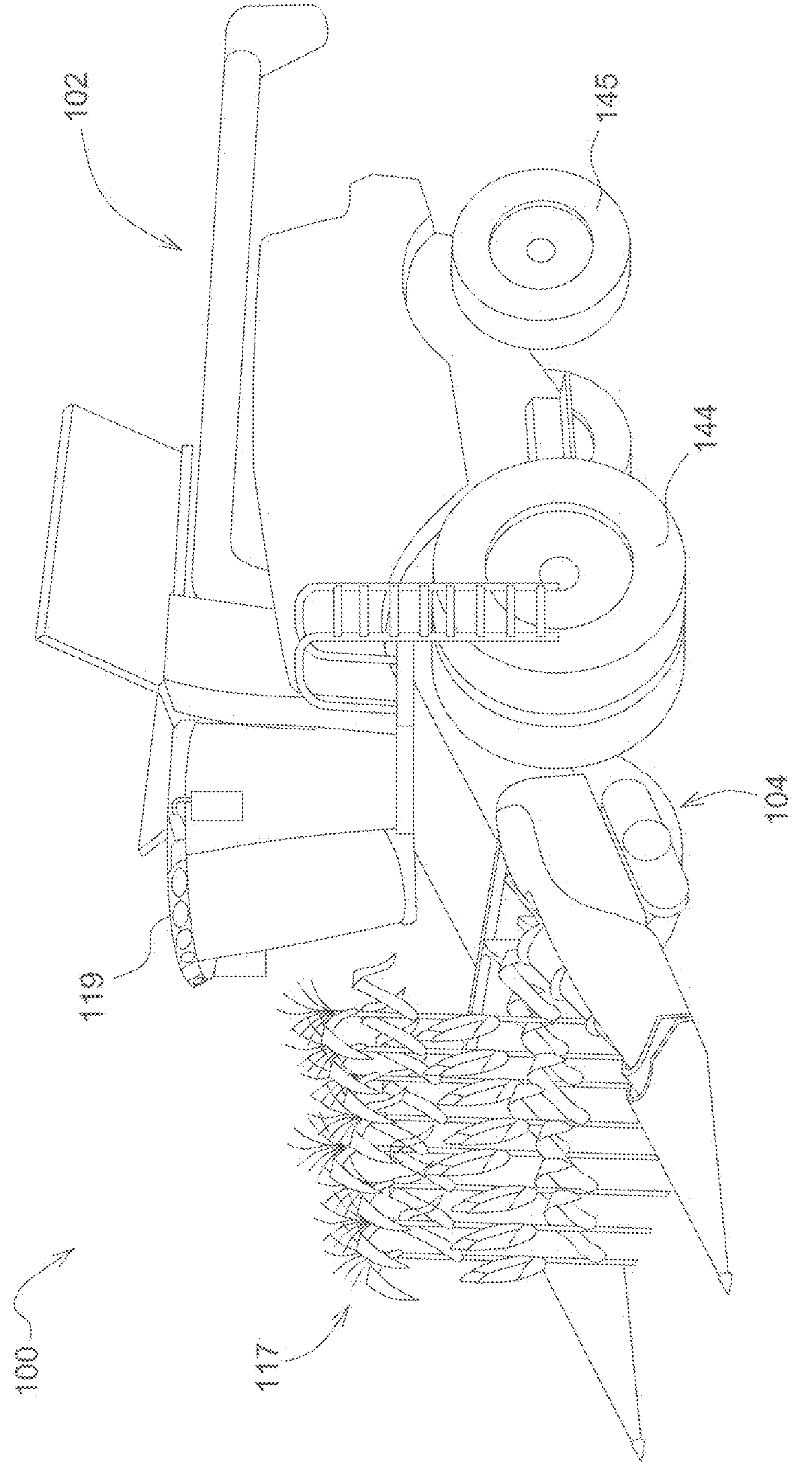
FIG. 1 is a perspective view of a mobile agricultural harvesting machine (harvester), according to example embodiments.

FIG. 1 is a perspective view of a mobile agricultural harvesting machine (or harvester) 100. Harvester 100 is illustratively shown as a self-propelled combine harvester 102 that includes a header 104, according to example embodiments. Header 104 engages, gathers, and cuts crop 117 at a field as the harvester travels over the field. While the example shown in FIG. 1 illustrates a corn header that engages, gathers, and cuts corn plants at a field as the harvester 100 travels over the field, in other examples, a mobile agricultural harvesting machine 100 can include a variety of different types of headers, such as a reel-type or draper header that engages, gathers, and cuts crop plants other than corn.

Harvester 100 further includes a set of ground engaging traction elements, such as front wheels 144 and rear wheels 145. In other examples, one or both of the front wheels 144 and rear wheels 145 can comprise other types of ground engaging traction elements, such as tracks. In some examples, one of the front wheels 144 and rear wheels 145 are used to steer while the other are driven by a propulsion subsystem to propel the harvester 100 across a field at which the harvester 100 operates. In the example illustrated, harvester 100 includes an operator compartment or cab 119, which can include a variety of different operator interface mechanisms for controlling harvester 100 as well as for displaying various information.

Figure 2:
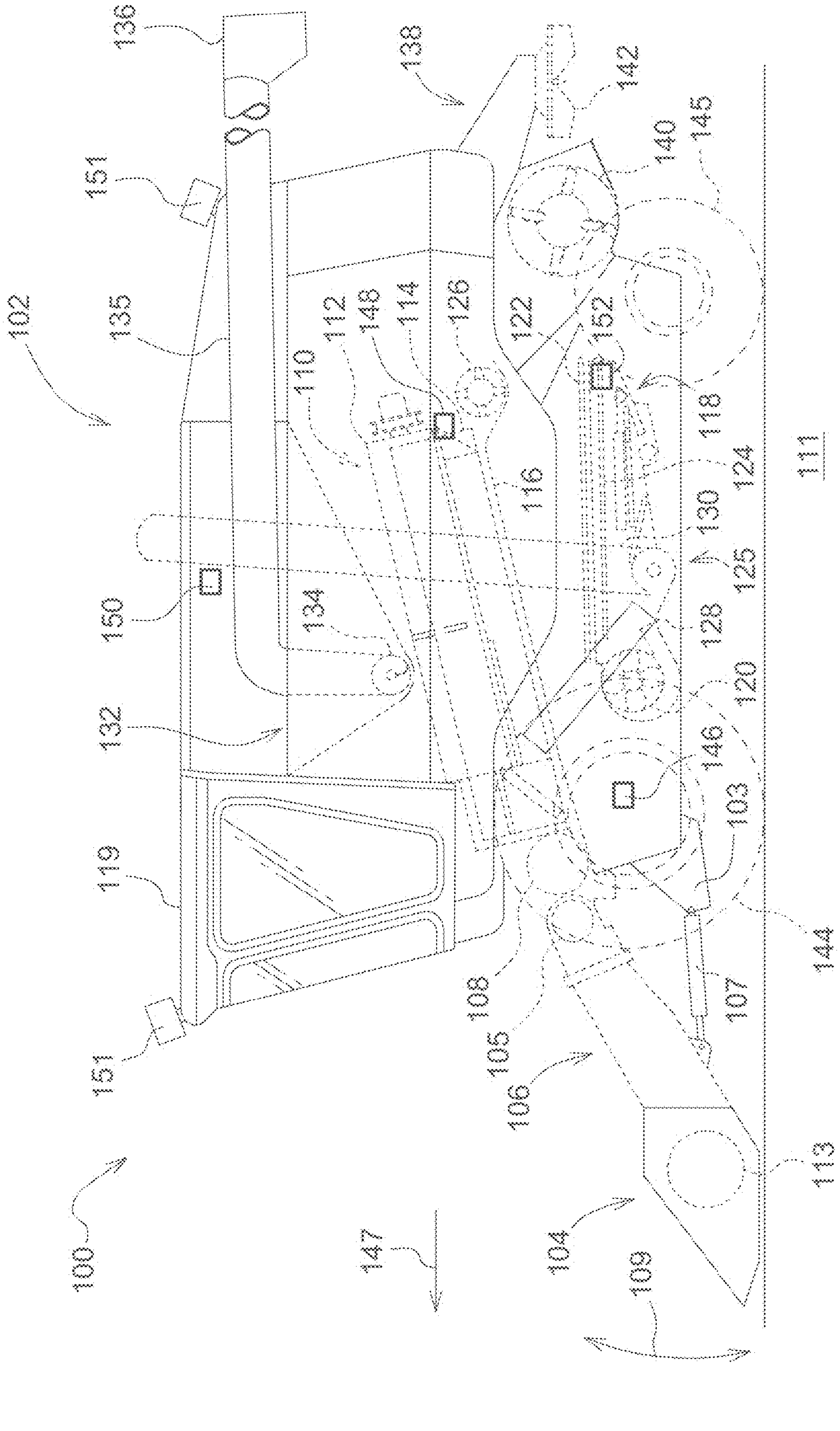
FIG. 2 is a partial pictorial, partial schematic, illustration of a harvester.

FIG. 2 is a partial pictorial, partial schematic, illustration of agricultural harvester 100. Some items in FIG. 2 are similar to items shown in FIG. 1 and thus are numbered similarly. As illustrated in FIG. 2, harvester 100 includes a feeder house 106, a feed accelerator 108, and a thresher generally indicated at 110. The feeder house 106 and the feed accelerator 108 form part of a material handling subsystem 125. Header 104 is pivotally coupled to a frame 103 of the non-header portion of combine harvester 102 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIGS. 1 to 2, agricultural harvester 100 may also include one or more actuators that operate to apply a tilt angle, a roll angle, or both to the header 104 or portions of header 104.

Agricultural harvester 100 includes a material handling subsystem 125 that includes the thresher 110. The thresher 110 illustratively includes a threshing rotor 112 and a set of concaves 114. Further, material handling subsystem 125 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes return tube 126, tailings elevator 128, and clean grain elevator 130. The clean grain elevator moves clean grain into clean grain tank 132. The return tube will be described in more detail below with reference to FIG. 3.

Harvester 100 also includes a material transfer subsystem that includes a conveying mechanism 134, a chute 135, and a spout 136. Conveying mechanism 134 can be a variety of different types of conveying mechanisms, such as an auger or blower. Conveying mechanism 134 is in communication with clean grain tank 132 and is driven to convey material from grain tank 132 through chute 135 and spout 136. Chute 135 is rotatable through a range of positions from a storage position (shown in FIG. 2) to a variety of positions away from agricultural harvester 100 to align spout 136 relative to a material receptacle (e.g., grain cart, towed trailer, etc.) that is configured to receive the material within grain tank 132. Spout 136, in some examples, is also rotatable to adjust the direction of the crop stream exiting spout 136.

Harvester 100 also includes a residue subsystem 138 that can include chopper 140 and spreader 142. Harvester 100 also includes a propulsion subsystem that includes an engine (or other form of power plant) that drives ground engaging traction components, such as 144 or 144 and 145 to propel the harvester 100 across a worksite such as a field (e.g., ground 111). In some examples, a harvester within the scope of the present disclosure may have more than one of any of the subsystems mentioned above. In some examples, harvester 100 may have left and right cleaning subsystems, separators, etc., which are not shown in FIG. 2.

In operation, and by way of overview, harvester 100 illustratively moves through a field 111 in the direction indicated by arrow 147. As harvester 100 moves, header 104 engages the crop plants to be harvested and cuts (with a cutter bar on the header 104, not shown in FIG. 2) the crop plants to generate cup crop material.

The cut crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by rotor 112 rotating the crop against concaves 114. The threshed crop material is moved by a separator rotor in separator 116 where a portion of the residue is moved by return tube 126 toward the residue subsystem 138. The portion of residue transferred to the residue subsystem 138 is chopped by residue chopper 140 and spread on the field by spreader 142. In other configurations, the residue is released from the agricultural harvester 100 in a windrow.

Grain falls to cleaning subsystem 118. Chaffer 122 separates some larger pieces of material other than grain (MOG) from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 100 can include a variety of sensors, some of which are illustrated in FIG. 2, such as ground speed sensor 146, one or more separator loss sensors 148, a grain camera 150, one or more loss sensors 152 provided in the cleaning subsystem 118, and/or an observation sensor systems 151, which may include, one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

Ground speed sensor 146 senses the travel speed of harvester 100 over the ground. Ground speed sensor 146 may sense the travel speed of the harvester 100 by sensing the speed of rotation of the ground engaging traction elements (such as wheels or tracks), a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, and/or GPS derivation, to determine the direction of travel in two or three dimensions in combination with the speed. This way, when harvester 100 is on a slope, the orientation of harvester 100 relative to the slope is known. For example, an orientation of harvester 100 could include ascending, descending or transversely travelling the slope.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Figure 3A:
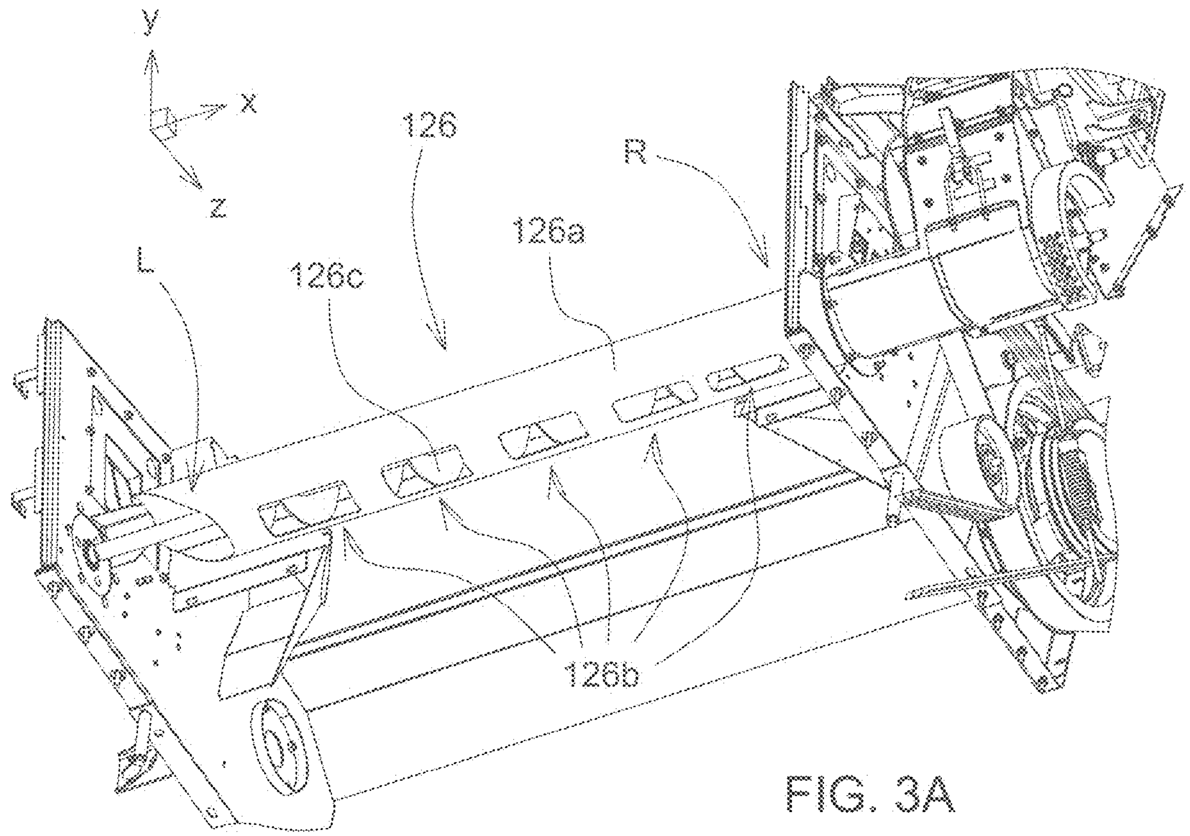
FIGS. 3A and 3B are illustrations showing a return tube according to example embodiments.
Figure 3B:
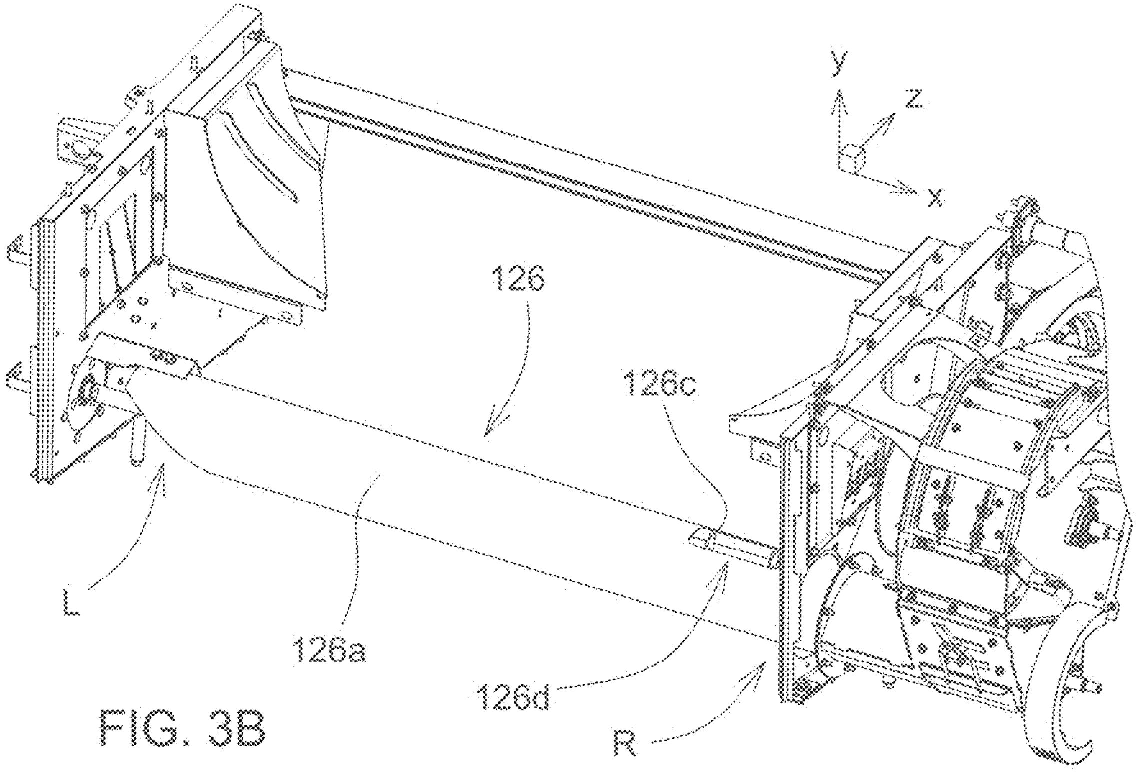

FIGS. 3A and 3B are illustrations showing a return tube according to example embodiments.

Referring to FIGS. 3A and 3B, return tube 126 may include a return tube body 126*a*, openings 126*b* and 126*d*, and/or auger 126*c*. Threshed crop material (e.g., grain/mog mixture) enters the return tube 126 from a right side R (also referred to as machine side left) of the return tube 126. A conveyor elevator (not shown) transitions the threshed crop material vertically to a housing connected to the auger 126*c*. The return tube 126 may remain stationary. For example, the return tube body 126*a* may not rotate about a longitudinal axis X.

The auger 126*c* rotates at a continuous speed to move the grain from the machine side left (e.g., the right side R) to the machine side right (e.g., a left side L shown in FIGS. 3A and 3B). As the grain moves through the return tube 126, the grain falls (e.g., is discharged) through the openings 126*b* to a pan below (e.g., a return pan) which conveys the grain mog mixture onto a pan (e.g. chaffer 122) for further processing. Excess grain may escape through the opening 126*d*. For example, the opening 126*d* may function as a relief outlet.

Because the grain is moved by the auger 126*c* through the return tube 126 from machine left to machine right, a distribution of grain on the pan may be uneven. For example, more grain may collect on the machine left side of the pan. A side of a return tube at which grain enters a return tube may be referred to as a machine left side herein.

Figure 4A:
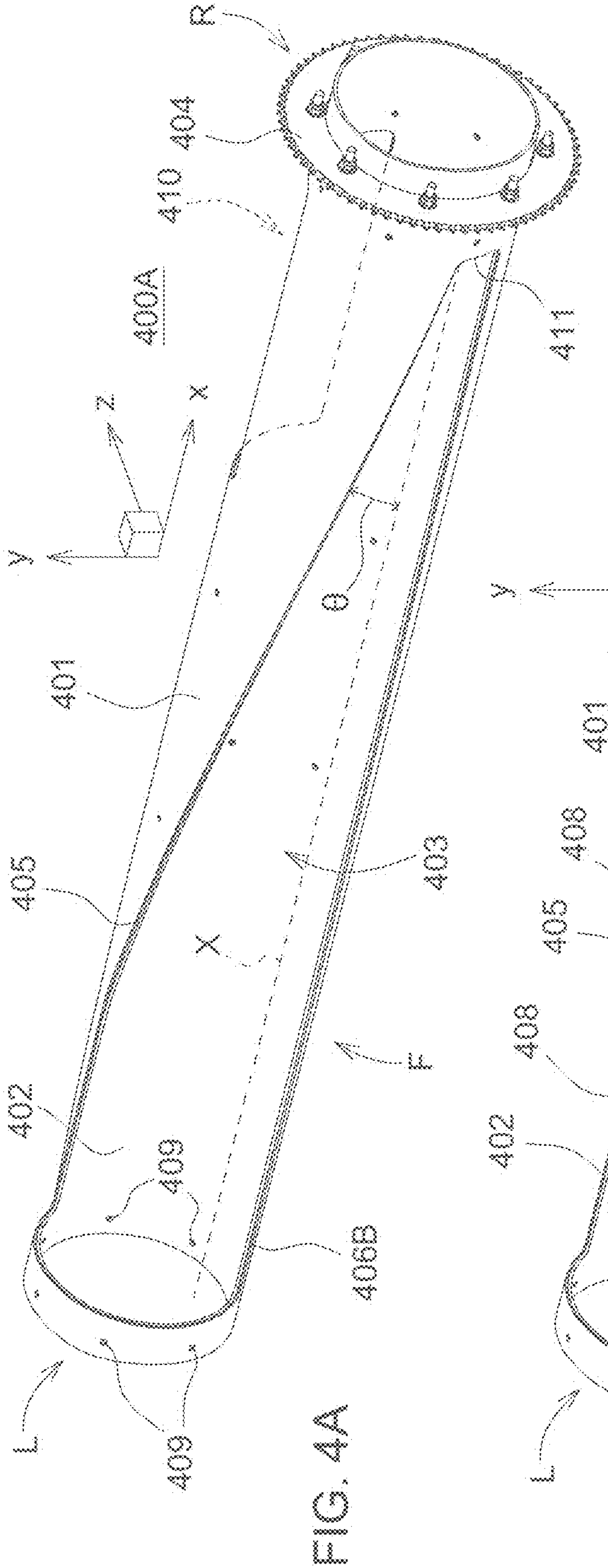
FIGS. 4A and 4B are illustrations of an active return tube according to example embodiments.

FIG. 4A is an illustration of an active return tube according to example embodiments.

Referring to FIG. 4A, an active return tube 400A, according to example embodiments, includes an outer frame 401, an inner frame 402, openings 403 and/or 410, and/or a gear 404. The outer frame 401 and/or the inner frame 402 may be referred to as a body of the active return tube 400A. The active return tube 400A may be configured to rotate about a longitudinal axis. The active return tube 400A may be designed to fit over and rotate around the return tube 126, as discussed in more detail with reference to FIGS. 5A-5B below. However, example embodiments are not limited thereto, and the active return tube 400A may replace the return tube 126.

The active return tube 400A may be a generally hollow cylindrical shaped structure. For example, the outer frame 401 and/or the inner frame 402 may be generally cylindrically shaped. The outer frame 401 may be comprised of a hard and/or rigid material. For example, the outer frame 401 may comprise a metal. For example, the outer frame 401 may be comprised of aluminum, steel, etc. The outer frame 401 may be comprised of a sheet metal.

The inner frame 402 provides a low friction interface between the active return tube 400A and the return tube 126. For example, the inner frame 402 may be comprised of a polymeric material. For example, the polymeric material may be a plastic material. For example, the polymeric material may be ultra-high-molecular-weight (UHMW) polyethylene.

As shown in FIG. 4A, opening 403 increases in size from the right side R of the active return tube 400A (e.g., machine side left) to the left side of the active return tube 400A (e.g., machine side right). A direction X from the left side L to the right side R of the active return tube 400A may be referred to as a longitudinal axis. A direction Z from a front F of the active return tube 400A to a back B of the active return tube 400A may be referred to as a transverse axis.

The harvester 100 may rotate the active return tube 400A via the gear 404. As illustrated in FIG. 4A, the gear 146 may be attached to a flange (not shown) of the active return tube 400A. For example, the gear 146 may be bolted to the flange of the active return tube 400A. However, example embodiments are not limited thereto and the gear 404 may be attached to the active return tube 400A via other means. Alternatively, the gear 404 may be conformally formed on the active return tube 400A.

As shown in FIG. 4A, the outer frame 401 and/or the inner frame 402 may include an angled cut side (e.g., a first side) 405 and a straight cut side (e.g., a second side) 406A defining the opening 403. The angled cut side 405 may extend from the right side R of the active return tube 400A (e.g., the machine side left) towards the left side L of the active return tube 400A (e.g., machine side right) at an angle of θ to the longitudinal axis X of the return tube 400A. For example, angle θ may be an angle oblique to the longitudinal axis X. For example, angle θ may be an acute angle to the longitudinal axis X. For example, angle θ may be between 0° and 90°. For example, angle θ may be approximately 60°.

The straight cut side 406A may extend, parallel to the longitudinal axis, from the right side R of the active return tube 400A (e.g., the machine side left) towards the left side L of the active return tube 400A (e.g., machine side right).

As shown in FIG. 4A, the angled cut side 405 and the straight cut side 406A may face each other (i.e., oppose each other) to form the opening 403. Thus, the angled cut side 405 and the straight cut side are opposite to each other with respect to the opening 403. The opening 403 as shown in FIG. 4A is shown as a quadrilateral opening including a sidewall 411 transverse to the longitudinal axis X. However, example embodiments are not limited thereto. For example, the active return tube may not include the sidewall 411 and the angled cut side 405 may extend further and contact the straight cut side 406A at an acute angle to form the opening 403 as a triangular opening. When the opening 403 is a triangular opening, the angled cut side 405 faces the straight cut side 406A and, thus, may be considered opposite to the straight cut side 406A.

The active return tube 400A may include an opening 410 on an opposite side of the active return tube 400A from the opening 403 in the transverse direction Z of the active return tube 400A. The opening 410 may be on the right side R of the active return tube 400A as shown in FIG. 4A (e.g., machine side left). For example, opening 410 may function as a relief outlet for accommodate grain overflow.

The active return tube 400A may include a plurality of holes 409 through the outer frame 401 and/or the inner frame 402. The outer frame 401 may be attached to the inner frame 402 via the plurality of holes 409. For example, the outer frame 401 may be attached to the inner frame 402 via rivets through the holes 409. Alternatively, the inner frame 402 may be conformally formed on the outer frame 402. In such a case, the holes 409 may be omitted.

Figure 4B:
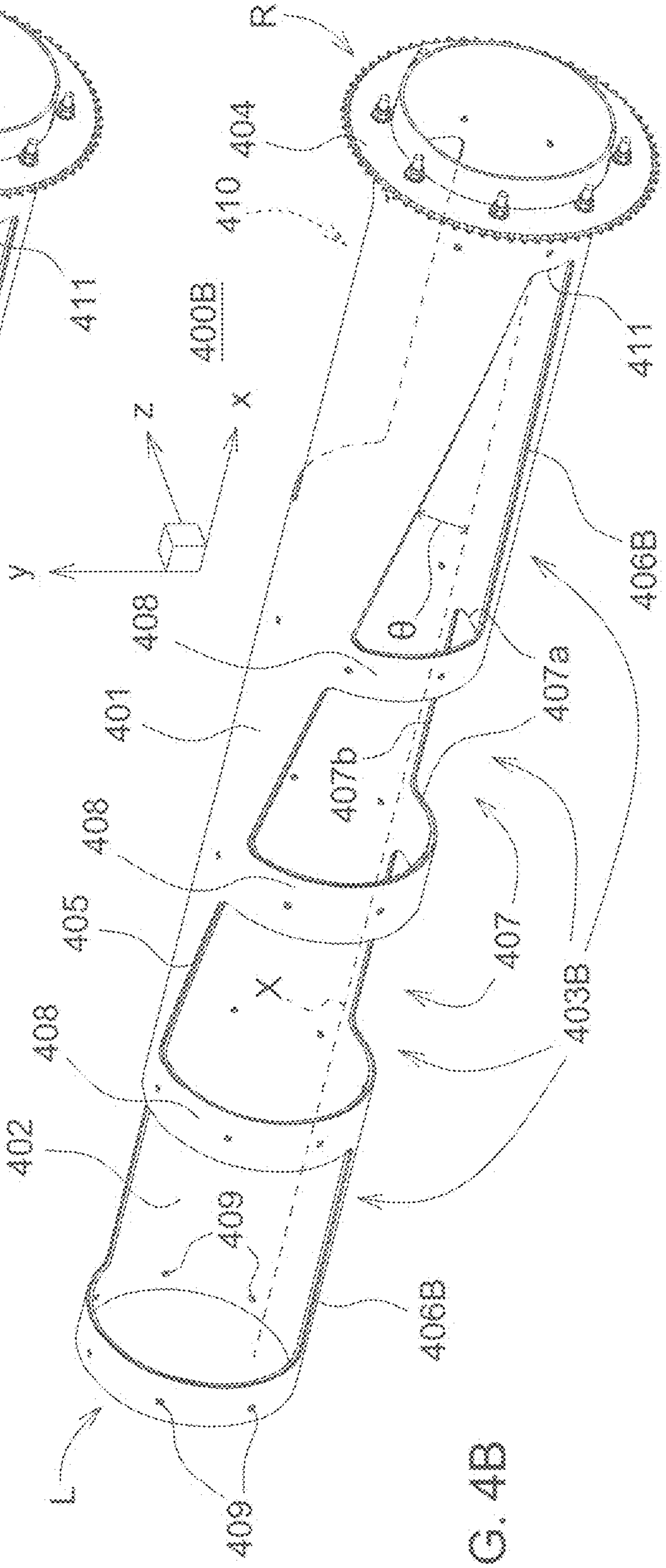

FIG. 4B is an illustration of an active return tube according to example embodiments.

Referring to FIG. 4B, different from the active return tube 400A, an active return tube 400B may include a plurality of openings 403B. The active return tube 400B shown in FIG. 4B includes four openings 403B. However, example embodiments are not limited thereto and the active return tube 400B may include fewer than four openings 403B or more than four openings 403B.

The openings 403B increase in size from the right side R of the active return tube 400B (e.g., machine side left) to the left side L of the active return tube 400B (e.g., machine side right). Additionally, a size of each opening 403B may increase from the right side R to the left side L, as shown in FIG. 4B (e.g., may increase from the machine side left to the machine side right).

The straight cut side 406B of active return tube 400B may include a plurality of indentations 407. The active return tube 400B shown in FIG. 4B includes two indentations 407. However, example embodiments are not limited thereto and the active return tube 400B may include fewer than two indentations 407 or more than two indentations 407.

Each indentation 407 includes a pair of side edges 407*a* and a front edge 407*b*. The side edges 407*a* extend from the straight cut side 406B in the transverse direction Z. The front edge 407*b* extends in the longitudinal direction X to connect the pair of side edges 407*a*.

The active return tube 400B may further include a plurality of strips 408 extending from the angled cut side 405 to the straight cut side 406B. The strips 408, the angled cut side 405, and the straight cut side 406B (including indentations 407) may define the plurality of openings 403B.

Figure 5A:
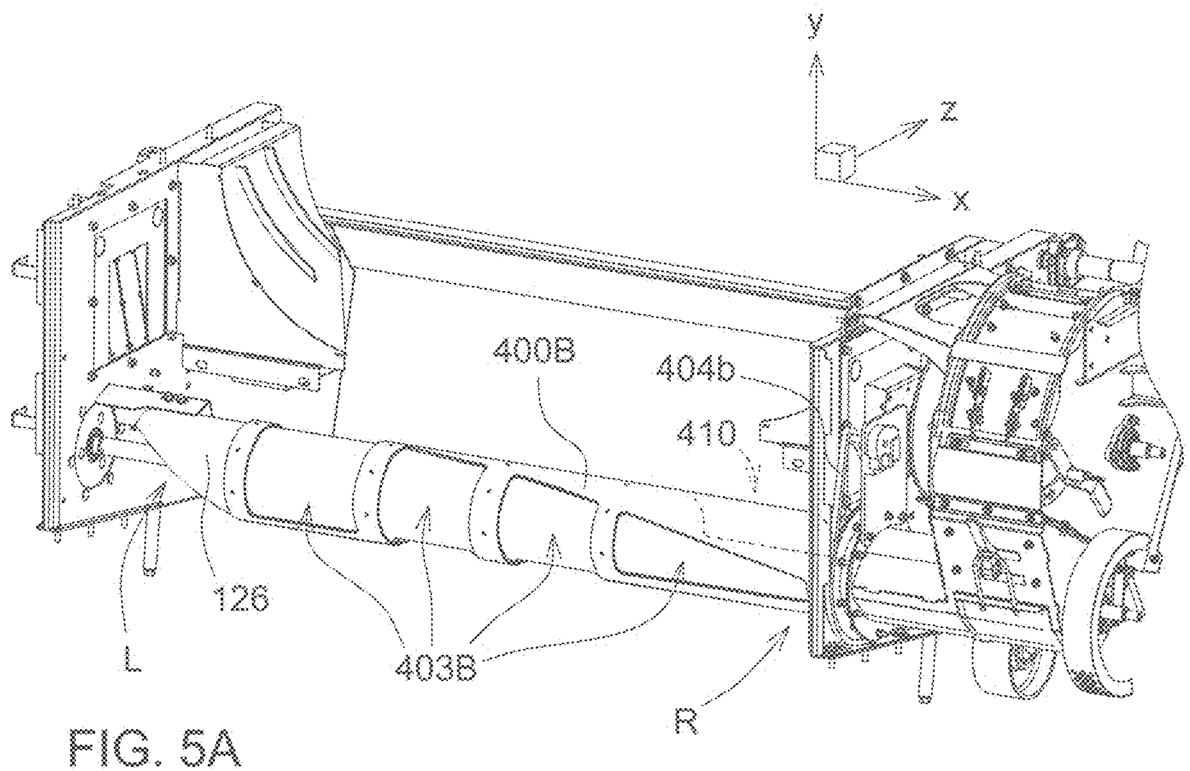
FIGS. 5A-5C are illustrations showing the active return tube attached to the return tube, according to example embodiments.
Figure 5B:
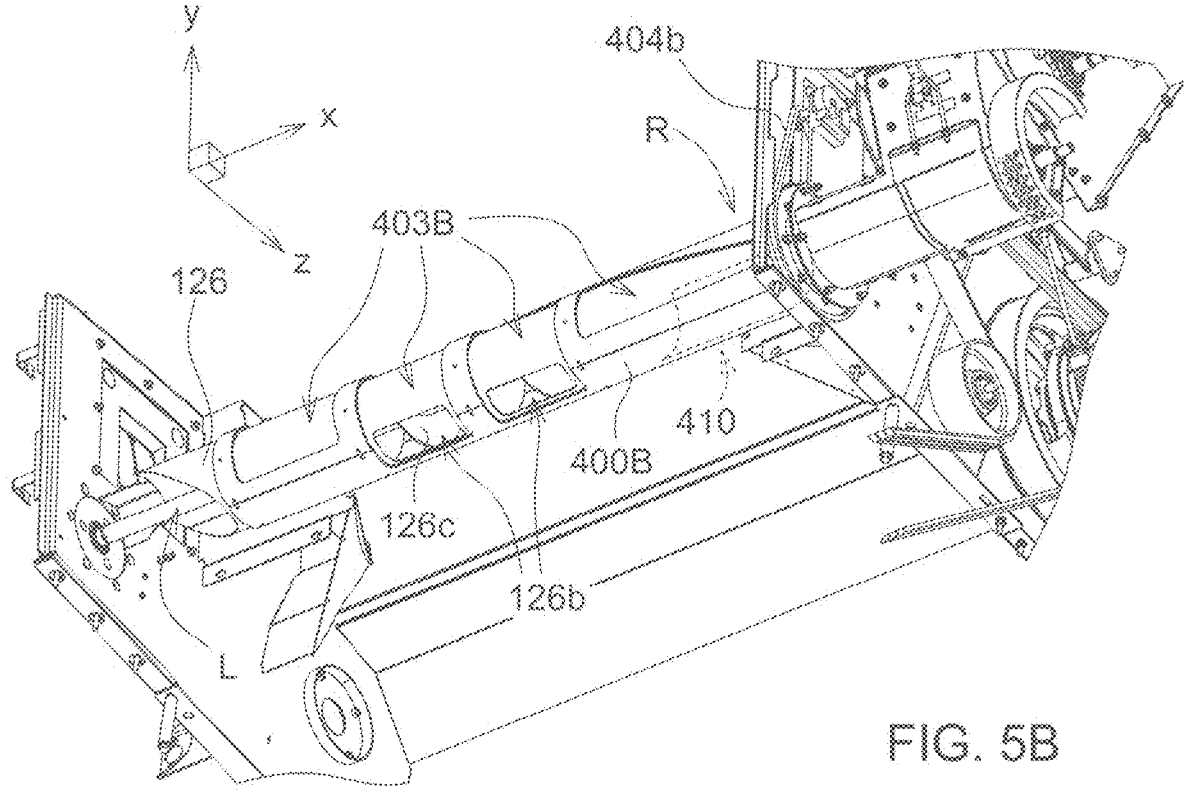
Figure 5C:
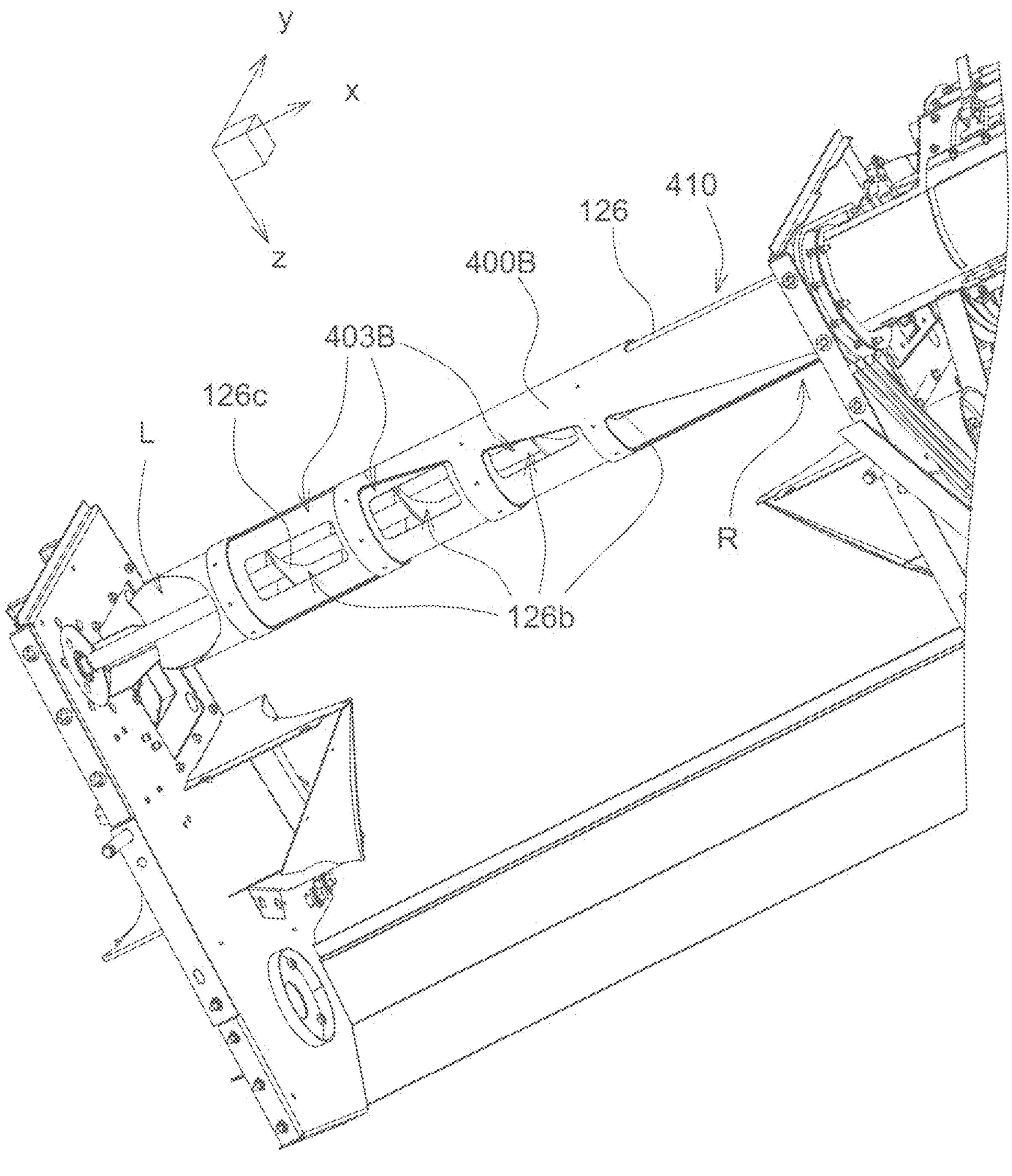

The active return tube 400B may be configured to rotate around the return tube 126. For example, the active return tube 400B may be installed surrounding the return tube 126, as shown in FIGS. 5A-5C, described in more detail below. The active return tube 400B may be rotated 360° about the longitudinal axis to gradually close the openings 126*b* of the return tube 126. For example, the harvester 100 may rotate the active return tube 400B via the gear 404.

FIGS. 5A-5C are illustrations showing the active return tube attached to the return tube, according to example embodiments.

Referring to FIGS. 5A-5C, for case of explanation, example embodiments will be described with reference to the active return tube 400B. However, it is to be understood that the active return tube 400A may be used in place of the active return tube 400B.

The active return tube 400B may be rotated about the return tube 126 by rotating the gear 404. The gear 404 may be rotated by a sprocket chain 404*b*. However, example embodiments are not limited thereto and the gear 404 may alternatively be driven by a belt and/or a gear. The sprocket chain 404*b*, the belt, and/or the gear may be driven by an electric or a hydraulic drive (not shown).

By rotating the active return tube 400B, an amount of grain that falls to the pan below the active return tube 400B at various positions along the longitudinal axis may be controlled. For example, because the openings 403 increase in sizes from the right side R (e.g., machine side left) to the left side L (e.g., machine side right) of the active return tube 400B, the active return tube 400B may be rotated so that the grain cannot fall from a position of the active return tube 400B closest to the right side R. The active return tube 400B may be rotated 360° about the longitudinal axis to gradually (e.g., progressively) close the active return tube 400B from the right side R (e.g., machine side left) to the left side L (e.g., machine side right). Therefore, according to the example embodiments, the active return tube 400B may allow for increased control of distribution of grain falling from the active return tube 400B.

Because the grain moves through the return tube 126 from the machine left side to the machine right side of the return tube 126, more grain may fall through the openings 126*b* (not shown in FIG. 5A) of the return tube 126 at the machine left side of the return tube 126 than may reach the machine right side of the return tube 126.

According to example embodiments, the active return tube 400B may be controlled to rotate around the return tube 126 to control the amount of grain that falls (e.g., is discharged) through the openings 126*b* of the return tube 126 and/or the openings 403B of the active return tube 400B.

For example, as the active return tube 400B is rotated about the return tube 126, the openings 403B of the active return tube 400B accommodate a set point to only allow center openings of the openings 126*b* to be open. The slope of the angled cut side 405 of the openings 403B allows gradual closure of the openings 126*b* of the return tube 126 from a machine left side to a machine right side progression as shown in FIG. 5C.

Because the grain is input to the return tube 126 from the machine left side, it is not necessary to close the openings 126*b* from a machine side right to a machine side left progression.

The rotation of the active return tube 400B may be controlled via a controller 600. For example, the active return tube may be either controller manually (e.g., controlled by a user via a user interface 604) or automatically by the controller 600.

For example, the controller 600 may calculate an error of an amount of grain falling from the return tube 126 and/or the active return tube 400B, and determine an adjustment of the active return tube 400B based on the calculated error. For example, the controller 600 may determine that too much grain is falling from the return tube 126 at the machine left side of the return tube 126 and may rotate the active return tube 400B to close openings at the machine left side of the return tube 126. The controller 600 may calculate an amount and/or a direction of the adjustment based on an input from a sensor (not shown) on the active return tube 400B and the calculated error. The controller 600 may calculate an amount and/or a direction of the adjustment based on an input from a sensor (not shown) on the harvester 100. The input from harvester 100 used by controller 600 may include machine pitch/roll parameters, machine processing grain loss parameters, etc. Alternatively, the controller may move the active return tube by a predetermined, or given, amount and/or in a predetermined, or given, direction.

Figure 6:
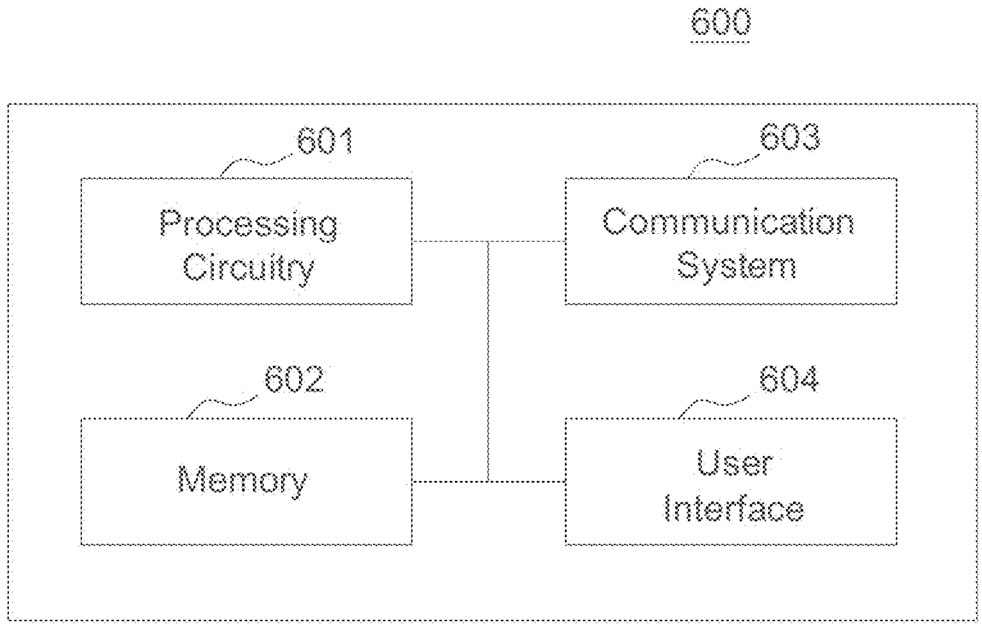
FIG. 6 is a block diagram of a controller of an example agricultural harvester.

FIG. 6 is a block diagram of a controller 600 of an example agricultural harvester 100. FIG. 6 shows that controller 600 illustratively includes processing circuitry 601 (such as at least one processor 601), a memory 602, a communication system 603, and/or a user interface 604.

The memory 602 may include various special purpose program code including computer executable instructions which may cause the agricultural harvester 100 to perform the one or more of the methods of the example embodiments. The communication system 603 may include a wireless communication interface and/or a wired communication interface. The controller 600 may receive signals from various sensors via the communication system 603. For example, the controller 600 may receive signals from the ground speed sensor 146, one or more separator loss sensors 148, the grain camera 150, one or more loss sensors 152 provided in the cleaning subsystem 118, and/or an observation sensor systems 151, which may include, one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation.

In at least one example embodiment, the processing circuitry may include at least one processor (and/or processor cores, distributed processors, networked processors, etc.), such as the at least one processor 601, which may be configured to control one or more elements of the agricultural harvester 100, and thereby cause the agricultural harvester 100 to perform various operations. The processing circuitry (e.g., the at least one processor 601, etc.) is configured to execute processes by retrieving program code (e.g., computer readable instructions) and data from the memory 602 to process them, thereby executing special purpose control and functions of the entire agricultural harvester 100. Once the special purpose program instructions are loaded into, (e.g., the at least one processor 601, etc.), the at least one processor 601 executes the special purpose program instructions, thereby transforming the at least one processor 601 into a special purpose processor.

In at least one example embodiment, the memory 602 may be a non-transitory computer-readable storage medium and may include a random access memory (RAM), a read only memory (ROM), and/or a permanent mass storage device such as a disk drive, or a solid state drive. Stored in the memory 602 is program code (i.e., computer readable instructions) related to operating the agricultural harvester 100.

A user may interact with the agricultural harvester 100 via the user interface 604. For example, the user interface may be one or more buttons and/or switches etc. Alternatively or additionally, the user interface may be a touch panel included in a display (not shown) in, for example, the cab 119.

The agricultural harvester 100 may be able to perform various functions automatically. For example, the agricultural harvester 100 may be able automatically control various settings. For example, the agricultural harvester 100 may include an automation system configured to monitor and adjust the rotation of the active return tube 400B.

Figure 7:
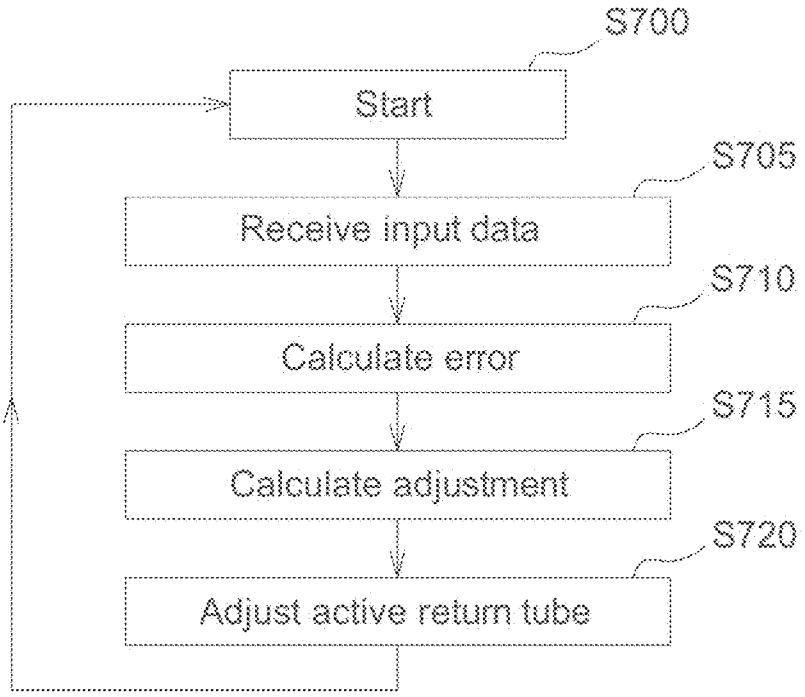
FIG. 7 is a flow chart illustrating a method according to example embodiments.

FIG. 7 is a flow chart illustrating a method according to example embodiments. The method shown in FIG. 7 may be performed by the controller 600 to control a rotation of an active return tube such as the return tube 400A or the return tube 400B.

Referring to FIG. 7, the method starts at S700. For example, at S700 the controller 600 begins a method for controlling the active return tube 400A or 400B. For case of explanation, example embodiments will be described controlling the active return tube 400B.

At S705, the controller 600 receives input data. For example, the controller 600 may receive input data from a tailboard sensor monitoring lost grain output from the harvester 100 cleaning subsystem 118 (e.g., grain not captured by the cleaning subsystem 118). The controller 600 may use signals from the harvester 100 tailboard sensor as input to direct grain/MOG output from the return tube 126 to improve the material distribution within the harvester 100 cleaning system. The controller 600 may additionally receive data from the active return tube 400B. For example, the active return tube 400B may include a sensor (not shown) indicating a current position of the rotation of the active return tube 400B.

At S710, the controller 600 calculates an error based on the inputs. For example, the controller 600 may calculate an error based on a comparison between the input from the tailboard sensor and a set point target. The set point target may be a value automatically set by the controller 600. For example, the set point target may be a predetermined or a given value. Alternatively, the set point target may be input by a user via the user interface 604.

At S715, the controller 600 calculates an adjustment based on the calculated error. For example, the controller 600 may determine that too much grain is falling from the return tube 126 at the machine left side of the return tube 126 and may rotate the active return tube 400B to close openings at the machine left side of the return tube 126. The controller 600 may calculate an amount and/or a direction of the adjustment based on the input from the active return tube 400B sensor and the calculated error. Alternatively, the controller may move the active return tube by a predetermined, or given, amount and/or in a predetermined, or given, direction.

At S720, the controller 600 adjusts the active return tube. For example, the controller 600 may drive a gear, a belt, and/or a sprocket chain via an electronic or a hydraulic drive according to the calculated amount and/or direction.

The method then returns to S700 and proceeds as described herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An active return tube comprising:

a hollow body defining a longitudinal axis, the hollow body including a first opening formed in the hollow body, the first opening defining a first side and a second side opposite the first side, the second side extending along the hollow body at an angle oblique to the longitudinal axis; and a gear configured to rotate the active return tube.

2. The active return tube of claim 1, wherein the first opening includes a plurality of first openings.

3. The active return tube of claim 2, wherein the plurality of first openings are spaced apart along the longitudinal axis.

4. The active return tube of claim 1, wherein the hollow body further includes a second opening on an opposite side of the hollow body from the first opening in a transverse direction.

5. The active return tube of claim 1, wherein the hollow body is cylindrical.

6. The active return tube of claim 1, wherein the hollow body includes an inner surface formed of a polymeric material.

7. The active return tube of claim 1, wherein the second side extends along the hollow body at the angle such that a size of the first opening increases in a direction of flow of material through the hollow body.

8. A harvester comprising:

a return tube including a first opening; and an active return tube configured to rotate about the return tube, the active return tube including a hollow body defining a longitudinal axis, the hollow body including a second opening formed in the hollow body, the second opening defining a first side and a second side opposite to the first side, the second side extending along the hollow body at an angle oblique to the longitudinal axis.

9. The harvester of claim 8, wherein the second opening includes a plurality of second openings.

10. The harvester of claim 9, wherein the plurality of first second openings are spaced apart along the longitudinal axis.

11. The harvester of claim 8, wherein the active return tube is configured to rotate about the return tube such that an amount of overlap between the first opening and the second opening changes as the active return tube rotates.

12. The harvester of claim 8, wherein the active return tube is configured to rotate about the return tube such that an amount that the active return tube obstructs the first opening changes as the active return tube rotates.

13. The harvester of claim 8, further comprising:

a controller configured to cause the active return tube to rotate about the return tube such that the second opening gradually aligns with of the first opening in a direction of flow of material through the hollow body of the active return tube as the active return tube rotates.

14. The harvester of claim 13, wherein the controller is further configured to determine to rotate the active return tube based on an amount of grain output from the return tube.

15. The harvester of claim 13, wherein the controller is further configured to determine an amount of rotation of the active return tube based on an amount of grain output from the return tube.

16. The harvester of claim 8, wherein the hollow body includes an inner surface formed of a polymeric material.

17. A method for controlling a rotation of an active return tube including a hollow body defining a longitudinal axis, the hollow body including a first opening formed in the hollow body, the first opening defining a first side and a second side opposite the first side, the second side extending along the hollow body at an angle oblique to the longitudinal axis, and a gear configured to rotate the active return tube, the method comprising:

controlling an amount of grain that is discharged from a first opening of the active return tube by controlling a rotation of the active return tube.

18. The method of claim 17, further comprising:

determining an amount of rotation of the active return tube based on an amount of grain discharged from the active return tube.

19. The method of claim 18, wherein the determining the amount of rotation includes determining a direction of rotation of the active return tube.

20. The method of claim 17, wherein the controlling the amount of grain that is discharged from the first opening includes rotating the active return tube about a return tube such that an amount of overlap between the first opening and a plurality of second openings of the return tube changes as the active return tube rotates.

* * * * *